UNITED STATES PATENT OFFICE

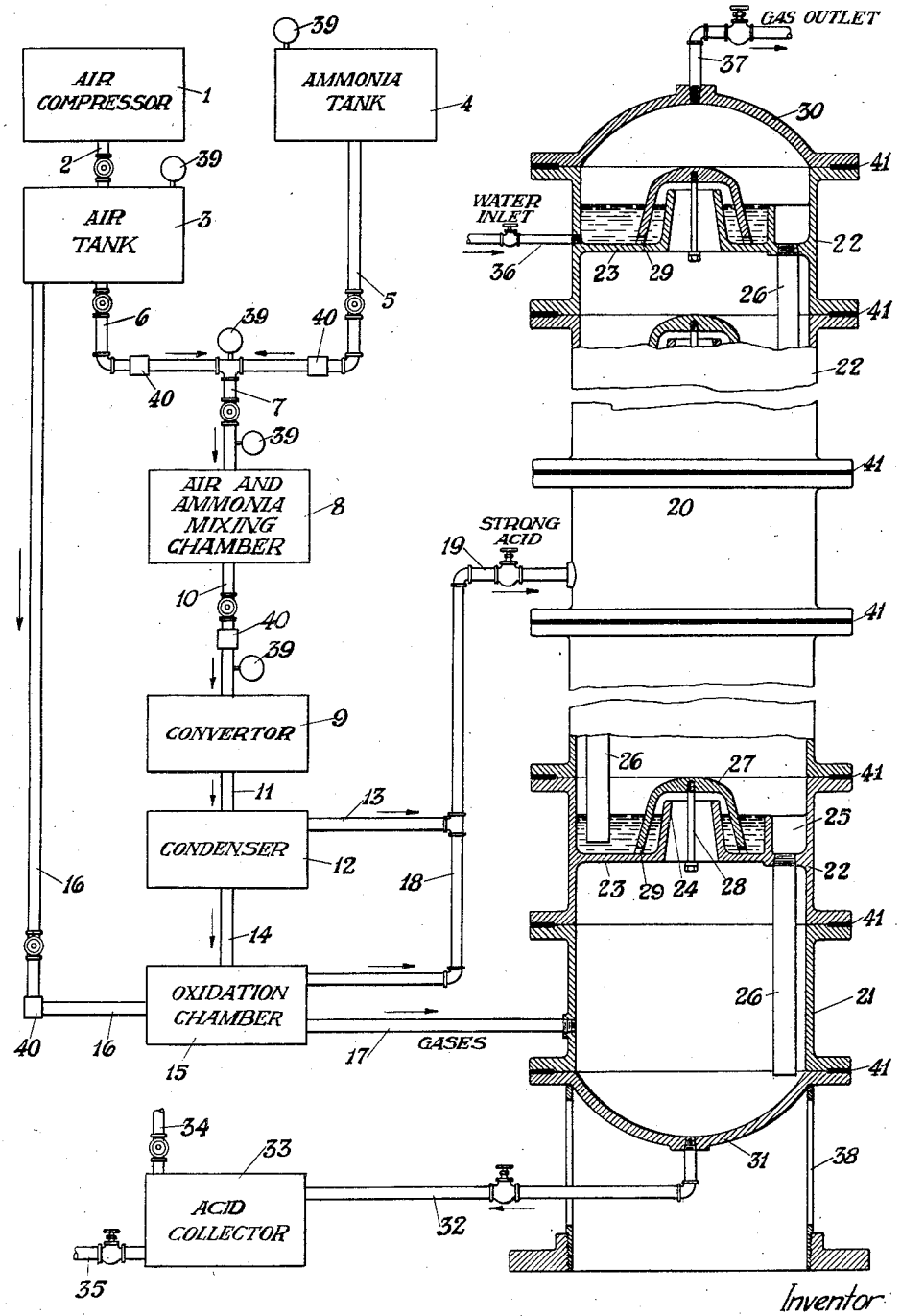

GUY B. TAYLOR, OF WILMINGTON, DELAWARE, ASSIGNOR TO E. I. DU PONT DE NEMOURS & COMPANY, OF WILMINGTON, DELAWARE, A CORPORATION OF DELAWARE

NITRIC ACID PROCESS

Application filed March 6, 1926. Serial No. 92,701.

This invention relates to a process for the manufacture of concentrated nitric acid from oxides of nitrogen, and comprises a series of alternate oxidation and absorption steps whereby nitric oxide is oxidized to nitrogen dioxide and the latter is absorbed in water or weak nitric acid, until substantially all of the oxides are absorbed, the process being carried out under pressures substantially above atmospheric.

The recovery of oxides of nitrogen as nitric acid by reaction with water is generally carried out in relatively large packed towers, constructed of acid-resistant brick or of granite. The large size of these towers is necessitated by the unique character of the absorption process. In any straight absorption process where solution or some simple chemical reaction is involved (e. g., absorption of ammonia in water or in sulphuric acid), the volume factor does not enter. In the conversion of nitrogen oxides to nitric acid, however, by reaction with water, two steps are involved:—

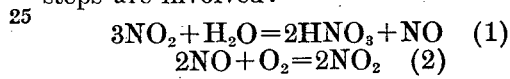

$$3NO_2 + H_2O = 2HNO_3 + NO \quad (1)$$
$$2NO + O_2 = 2NO_2 \quad (2)$$

The first is an equilibrium reaction governed by the acid concentration of the absorbing medium and by the temperature. The second is irreversible at the temperatures encountered in absorption practice, but is a time reaction requiring an appreciable time to take place to any marked degree. This time factor accounts for the great size required for nitrogen oxide absorption systems operating at atmospheric pressure.

For the absorption of oxides of nitrogen under pressure, the only system hitherto proposed has been substantially the same as has been used at atmospheric pressure, namely packed towers. The size of the system required is reduced in proportion to the square of the operating pressure, because the pressure has an effect of this order of magnitude on the rate of oxidation of nitric oxide to nitrogen peroxide. For example, a tower operating under ten atmospheres pressure need be only one percent as large as one operating at atmospheric pressure. However, when working at pressures above atmospheric, even though the size of the towers can be reduced very much, it is still an inefficient operation, and the concentration of the acid produced is low. A further objection is the complicated and costly equipment required for carrying out the process. Another objection to the use of packed towers is that the quantity of water added to the absorption system is comparatively small, and uneven distribution of the absorbent is a detrimental result. Recirculation of the absorbing liquid has been proposed, but is a difficult and costly expedient when operating under pressure.

It is one of the objects of my invention to produce more concentrated nitric acid than is obtained in the usual methods of absorbing nitrogen oxides in water, by utilizing pressure absorption and oxidation without the usual disadvantages of such operation. It is another object to carry out my process in such an efficient manner as to simplify the necessary equipment as well as reduce its size and cost, and to increase its durability. The process is particularly advantageous when used for the manufacture of concentrated nitric acid where the addition of but little water is possible in order to obtain strong acid. Other advantages will be evident from the description of my process.

These objects are attained by maintaining a series of pools of nitric acid of different strengths and arranged in the order of their decreasing concentration, in which pools nitrogen dioxide is absorbed by passing the dioxide-containing gas therethrough seriatim beginning with the pool containing the most concentrated acid. Concentrated acid is drawn off from the first pool and each pool is gradually supplied with weaker acid from the next succeeding pool, the last pool being supplied with water. The depth of all of the pools is maintained substantially constant. The nitrogen dioxide is supplied by the oxidation of nitric oxide, a period of oxidation preceding each absorption. The whole operation of alternate oxidation and absorption is carried out at pressures substantially above atmospheric. The alternate action may be continued to any suitable point and while complete oxidation and absorption are theoretically impossible, for all practical purposes the process can be continued until substantially all of the nitrogen oxides are absorbed.

The nitrogen oxide-containing gases which are used as the source of nitric oxide may be obtained in any suitable manner. The gases may be those obtained by the formation of oxides of nitrogen by the so-called arc process. The oxides of nitrogen may also be conveniently obtained by the oxidation of ammonia. In practically all of the processes for the formation of oxides of nitrogen, an excess of oxygen, air or other oxygen-containing gas is usually present in addition to the oxides of nitrogen. This contained oxygen is utilized in the further oxidation of the nitric oxide to nitrogen dioxide. If desired, however, additional oxygen or oxygen-containing gas may be added at any suitable point in the process for the purpose of furnishing the necessary oxygen for the conversion of the nitric oxide.

In practicing my invention, I carry out the oxidation of the nitric oxide and the absorption of the nitrogen dioxide at pressures substantially above atmospheric. These pressures may vary greatly, but for most purposes I prefer a pressure of about 100 pounds per square inch. The compression of the gases may be effected in any suitable manner. The oxides of nitrogen may be mixed with oxygen or air, and the mixture compressed. It is often possible to obtain the nitrogen oxides as the result of processes which themselves are, or may be, carried out under pressure, such as, for instance, the arc process or the ammonia oxidation process. By utilizing the nitrogen oxides under pressure, as obtained from a pressure process, the formation of nitric acid under pressure may be allowed to follow directly without releasing the pressure of the nitrogen oxide gases, thereby eliminating the necessity of recompressing these gases.

As described, the nitrogen dioxide is successively absorbed in a series of pools of nitric acid. As is well known, the nitric oxide contained in the gas or formed during the absorption is insoluble in water under the conditions prevailing in general absorption practice. In order to utilize to the fullest extent the nitrogen oxides to form nitric acid, I divide my process into a series of alternate absorption and oxidation steps. In order to obtain efficient operation of the process, it is generally necessary that a minimum time be permitted for oxidation of the nitric oxide between the successive absorption steps. This time is found to vary somewhat with the pressure of operation, but in general, a period of at least five seconds should be permitted for each oxidation step.

It has also been found that for efficient operation and for forming strong nitric acid (say, about 60%), it is necessary that there be a minimum number of absorption and oxidation steps. I have found that ten is about the minimum number of oxidation steps and of absorbent pools with which satisfactory results can be obtained. Even more efficient operation is obtained by increasing the number of successive steps, and for general purposes fifteen oxidation steps and a like number of absorption steps give excellent results.

I shall describe my invention in detail, as applied to the products of oxidation of ammonia, for which it is especially advantageous, because of the very limited amount of water that is available for introduction for absorption purposes. In addition, the oxidation of ammonia may easily be carried out under pressuers suitable for the absorption steps without affecting the formation of the oxides of nitrogen.

The procedure followed in carrying out my process may conveniently be described in connection with the accompanying drawing, which is a somewhat diagrammatic flow sheet showing a detailed absorption and oxidation apparatus, partly in elevation and partly in section.

Air compressor 1 delivers air under pressure by valved line 2 to air tank 3 which is provided with valved delivery line 6. Ammonia tank 4 is connected to valved delivery line 5. Lines 5 and 6 are both connected to valved line 7 which delivers both air and ammonia to the air and ammonia mixing tank 8. Convertor 9 is connected to the mixing tank by valved line 10. Line 11 connects the convertor 9 with condenser 12, which in turn is provided with line 13 for liquid condensate and line 14 to an oxidation chamber 15. Air from the air tank 3 may be supplied to the oxidation chamber by means of valved line 16. The oxidation chamber is provided with line 17 for gaseous products, and is also provided with line 18 for any liquid products condensing in this chamber. Liquid lines 13 and 18 join valved line 19, which connects to a section of the oxidation and absorption column designated as a whole by 20. Line 17 connects the oxidation chamber 15 with the lowest section or sump 21 of the oxidation and absorption column 20. The oxidation and absorption column is made up of a number of sections 22 placed one upon the other in any suitable manner, using as many sections as may be desired. These sections 22 form absorption shelves, having an integral base plate 23 with an opening in the center thereof formed by the upstanding wall 24 and having an overflow cup 25, into which is fitted a drain pipe 26 for carrying liquid from one plate to the next lower plate. The top of the drain cup 25 is somewhat lower than the height of the wall 24. The opening formed by wall 24 is covered by a cap 27 held in place by bolt and nut 28, and the cap is provided with openings or perforations 29 at or near the base thereof. The top and bottom of the column are closed off by means of plates 30 and 31, respectively. Fitted into a central aperture in plate 31 is valved pipe connection 32 leading to an acid collector 33, which is provided with suitable valved vent 34 and draw-off line 35. The uppermost section 22 of the tower is provided with valved water inlet pipe 36 which delivers water to the top of the plate 23 in this section. Top covering plate 30 is provided with an aperture into which is fitted valved gas outlet line 37. The whole tower is supported upon a suitable base or foundation 38. Suitable pressure gauges 39 and meters 40 are provided at desired points for controlling the flow of the gases. Any desired form of packing 41 may be used between the several sections of column 20.

In operation the ammonia oxidation apparatus functions in the usual manner. Ammonia under suitable pressure from the ammonia tank 4 passes through valved line 5, meter 40 and joins in line 7, air under pressure from the air tank 3 coming through valved line 6 and the meter 40 in this line. The air and ammonia are mixed in the mixing chamber 8 and the mixture is delivered by valved line 10 to the converter 9 where the ammonia is oxidized to form steam and oxides of nitrogen. The steam and oxides of nitrogen pass through line 11 to condenser 12 where the steam condenses and in condensation absorbs some nitrogen dioxide to form nitric acid. The liquid nitric acid is separated in the condenser from the uncondensed gases, and passes by lines 13 and 19 to a suitable point in the oxidation and absorption tower, preferably about the middle. The uncondensed gases pass by line 14 to the oxidation chamber 15, wherein the nitric oxide in the gas is given sufficient time to oxidize to some extent, auxiliary air being supplied, when necessary, from air tank 3 by means of valved line 16. Any water or liquid nitric acid which collects in the oxidation chamber is conducted by means of lines 18 and 19 to the oxidation and absorption tower. The nitrogen oxide gases from the oxidation chamber are conducted by means of line 17 to the bottom section 21 of the absorption tower. These gases pass through the central opening in the lowermost plate 23 and through the perforations 29 in the cap 27 to the next higher section in the absorption tower. During the passage of the gases through these perforations 29 they are submitted to a scrubbing by the pool of liquid on the plate 23, thereby removing the nitrogen dioxide in the open space between the succeeding plates the nitric oxide remaining in the gas reacts to a further extent with the oxygen in the gas forming further nitrogen dioxide. The nitrogen dioxide-containing gas then passes through another plate 23 and is submitted to another scrubbing. This alternate oxidation and scrubbing takes place in each section of the tower until the remaining gases are permitted to leave the tower through the gas outlet 37. Water is fed to the top section of the absorption column through valved inlet 36. This feeding may be intermittent or continuous, as is found necessary. As the water is fed into the top section, the pool of liquid formed upon the top plate 23 overflows into the cup 25. This overflow is then carried by pipe 26 to the next lower pool. Each plate 23 is supplied with this overflow arrangement and the successive pools vary in acid strength from substantially pure water at the top to concentrated acid at the bottom. The concentrated acid from the lowermost plate 23 flows into the overflow cup 25 in this plate, and by pipe 26 into the sump 21. The acid which collects here is carried off by valved line 32 to the acid collector 33 and thence to any suitable point of disposition. The air and ammonia from tanks 3 and 4, respectively, are under pressure substantially above atmospheric, and this pressure is maintained throughout the entire oxidation and absorption system, being released, if desired, by a suitable pressure reducing valve in line 37.

The oxidation and absorption system may be operated at any suitable pressures above atmospheric, but for optimum results, it has been found best to operate between 75 and 150 pounds pressure above atmospheric. A pressure of 100 to 125 pounds is generally the range employed, but this may vary somewhat within the limits pointed out. As has been described, the nitrogen oxide gases are formed under suitable pressures and do not require further compression. If desired, however, the nitrogen oxide gases from any suitable source under pressures below that required for most efficient oxidation and absorption, may be compressed to the proper degree by any suitable apparatus, prior to their introduction into the oxidation and absorption system. The same procedure may be followed with the air or other oxygen-containing gas used for oxidation, the gas being compressed with the nitrogen oxide gases or compressed alone and then being mixed with the compressed oxide gases.

The size and shape of the absorption and oxidation apparatus may be varied to suit changing conditions such as strength of acid desired, etc. However, it has been found preferable that the oxidation space be of sufficient size to allow a period of at least about five seconds for oxidation between absorptions. Likewise, the number of oxidation and absorption steps may be varied, but in the manufacture of concentrated acids (say over 55%), best results are obtained by having at least ten oxidation steps alternating with at least a like number of absorption steps. For most purposes, about fifteen oxidation steps alternating with a similar number of absorption steps give excellent and efficient results. The number of steps may be changed to bring about any desired results without departing from the spirit of the invention.

Any suitable materials may be used in the construction of the apparatus. Chromium steel alloys have been found to be especially valuable, as they are capable of withstanding the pressures used and at the same time are not subject to corrosion by the acids and gases. Any other substance which will resist pressure and corrosion may be employed if desired.

I claim:

1. The process of producing concentrated nitric acid which comprises oxidizing ammonia to form nitrogen oxide gases, cooling the gases to remove condensable compounds, separating the condensate from the gases, oxidizing the gases to form nitrogen dioxide, absorbing the dioxide in strong nitric acid thereby strengthening the acid and forming nitric oxide, oxidizing the nitric oxide-containing gases coming from the absorption to form nitrogen dioxide, absorbing the dioxide formed in somewhat weaker nitric acid than that used in the previous absorption, and continuing the alternate oxidation and absorption until substantially all of the nitrogen oxides are removed from the gases, the dioxide in each absorption being absorbed in nitric acid successively weaker than that used in the previous absorption, the final absorption being in water containing substantially no nitric acid, the condensate from the cooling of the ammonia oxidation products being added to one of the intermediate absorbents, and the absorptions and nitric oxide oxidations being carried out at pressures of 75-150 pounds per square inch above atmospheric.

2. The process of producing concentrated nitric acid, which comprises oxidizing ammonia to form nitrogen oxide gases, cooling the gases to remove condensable compounds, separating the condensate from the gases, oxidizing the gases to form nitrogen dioxide, absorbing the dioxide in a pool of strong nitric acid thereby increasing the strength of the acid and forming nitric oxide, oxidizing the nitric oxide-containing gases coming from the absorption to form nitrogen dioxide, absorbing the dioxide formed in a pool of somewhat weaker nitric acid than that used in the previous absorption, continuing the alternate oxidation and absorption until substantially all of the nitrogen oxides are removed from the gases, the dioxide in each absorption being absorbed in a pool of nitric acid successively weaker than that used in the previous absorption, the final absorption being in a pool of water containing little or substantially no nitric acid, the condensate from the cooling of the ammonia oxidation products being added to one of the intermediate pools, adding a regulated quantity of water to the final absorption pool, removing strong acid from the first absorption pool, and passing liquid from each pool to the next succeeding pool of greater acid strength, the entire process being carried out at pressures of 75-150 pounds per square inch above atmospheric.

In testimony whereof I affix my signature.

GUY B. TAYLOR.

CERTIFICATE OF CORRECTION.

Patent No. 1,840,063. Granted January 5, 1932, to

GUY B. TAYLOR.

It is hereby certified that error appears in the printed specification of the above numbered patent requiring correction as follows: Page 2, line 85, for "pressuers" read pressures; page 3, line 61, after the word "dioxide" insert a period, and in same line, for the word "in" read In; and that the said Letters Patent should be read with these corrections therein that the same may conform to the record of the case in the Patent Office.

Signed and sealed this 23rd day of February, A. D. 1932.

M. J. Moore,
Acting Commissioner of Patents.

(Seal)